L. EAMES.
AUTOMATIC GRAIN METER.
No. 28,262.  Patented May 15, 1860.
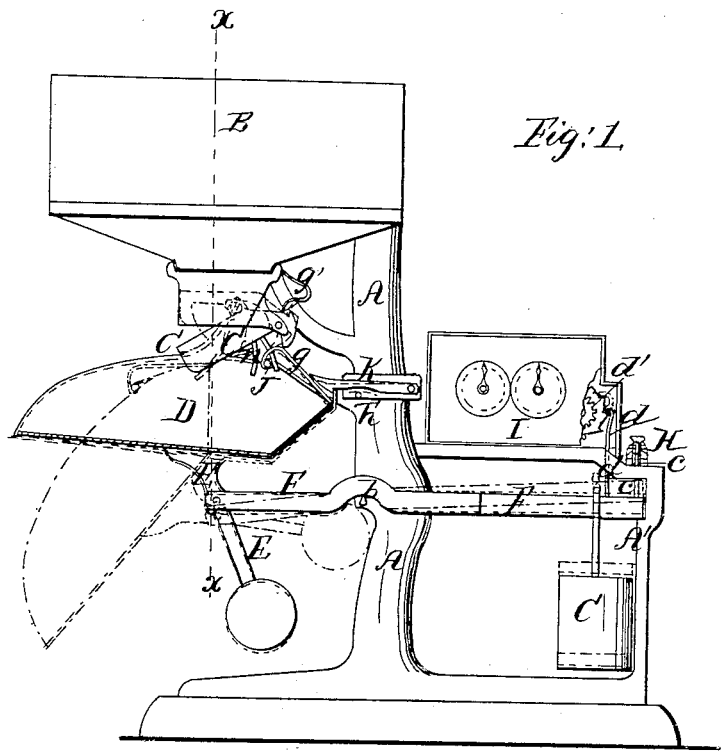
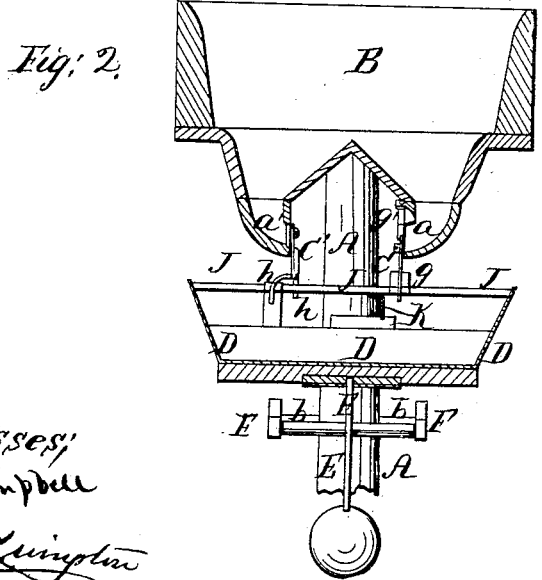
Witnesses:
R. J. Campbell
[signature]
Inventor:
Lovett Eames

UNITED STATES PATENT OFFICE.

LOVETT EAMES, OF KALAMAZOO, MICHIGAN.

AUTOMATIC GRAIN-WEIGHING MACHINE.

Specification of Letters Patent No. 28,262, dated May 15, 1860.

*To all whom it may concern:*

Be it known that I, LOVETT EAMES, of Kalamazoo, in the county of Kalamazoo and State of Michigan, have invented a new and Improved Automatic Grain-Meter; and I do hereby declare that the following is a full, clear, and exact description of the same, reference being had to the accompanying drawings, forming a part of this specification, in which—

Figure 1, represents a side elevation of my improved grain meter, showing the hopper, weighing box, or receiver, with the scale beam on which it is hung; also the index or dial plate for registering the quantity measured. These parts for effecting the weighing of grain automatically are each shown in their three relative positions, the black lines representing the parts at rest, and the weighing box in a position for receiving a full flow of grain from both orifices in the bottom of the hopper, the red lines represent the several parts in a position for receiving the charge from the small orifice of the hopper, the secondary weight being brought to act on the scale beam and the large hopper orifice is closed, the blue lines represent both orifices of the hopper closed and the receiver in a tilted state to discharge the measured quantity. Fig. 2, exhibits the interior of the hopper, shown in a transverse vertical section taken through the perpendicular red lines $x$, $x$, of Fig. 1. This figure shows clearly the two mouthed hopper, and the means for opening and closing the gates of the same. The receiver or weighing box is also shown pivoted to the scale beam.

Similar letters of reference indicate corresponding parts in both figures.

To enable those skilled in the art to fully understand my invention I will proceed to describe its construction and operation.

In the drawings A represents a standard or frame-work for supporting the several parts for effecting the automatic weighing and registering of grain, to the top of which is attached the hopper or garner B, which consists of a box of any suitable capacity, having a double discharging bottom terminating in two, side orifices $a$ $a'$, through which the grain flows from the body of the hopper. One ($a'$) of these orifices is much smaller than the other ($a$), for the purposes hereinafter described, and they are each closed at suitable times by vibrating gates C, C′, which cut off the supply upward, and are operated so as to open and close the orifices by a spring and cam for the gate C, and a bifurcated lever for the gate C′.

D is the scale, receiver or weighing box which is secured in a suitable manner to a weighted lever E, which I wish to term a secondary lever; this weighted lever has its fulcrum in the end of the bifurcated portion of the scale beam F, and it is furnished with a weight on its lowermost end which may be adjustable if desired.

The scale beam F, is supported on knife edges $b$, projecting from the standard A, and proceeds back a suitable length and rests on a projection of a post A′, and receives a suitable scale weight G.

H is a secondary weight which with G, constitutes the exact balance, and indicates the exact weight of each charge for the receiver D. This secondary weight H, is brought into action by a pin $c$, which proceeds up from the scale beam F.

$d$ is a catch pawl which operates a ratchet wheel $d'$. At each vibration of the scale beam said ratchet wheel is in gear with a train of wheel work and indicates on the dial plate I, the number of discharges in a day, week, or month.

For all ordinary purposes the single scale beam F, will serve for weighing given charges, but where fractions of a charge are to be weighed, a secondary beam, with a weight, should be hung under the primary beam, but this forms no part of my invention and will therefore not be particularly described.

The principal feature of my invention and that on which depends the perfect and successful operation of the entire machine, is the manner of hanging the receiver D, on the end of the scale beam F, so that when the full charge of grain is received by it, at that instant it will tilt over, discharge its contents and return back to its former position for receiving another supply; and in this way, each charge will be weighed, discharged, and registered on the index plate I, as above described. In order that the receiver may thus operate and continue its vibrations on the end of the scale beam, the weight on the lever E, should partially counterbalance the receiver and grain, it should be heavier than the receiver, but lighter than the receiver and grain combined, it will thus allow the receiver to tilt over and discharge its contents, and after this it will return the receiver back to its position represented in black lines by the drawings. This receiver has a bridge tree J, extending transversely from side to side on which is a curved plate $g$; which serves as a cam to operate the gate C. By opening it, as the receiver returns quickly back to its position for receiving the grain and holding it open until the weight of grain flowing in, this end of the scale beam counterbalances the weight G, then the scale beam with the receiver D, descends, allows the spring $g'$, to close the gate C, with an upward stroke and brings the pin $c$, on the opposite end of the scale beam in contact with the small secondary weight H. The grain from the hopper now continues slowly to flow from the orifice $a'$, until the secondary weight H, is raised and at this instant the grain in the hopper will have counterbalanced the two weights on the scale beam, and the counterweight on the secondary lever E, and the receiver will tilt over and discharge its contents. The small orifice should be closed at this moment so that all discharge from the hopper will be cut off and to effect this, two arms $h$, $h$, which connect with the gate C′, are placed astride the bridge tree J, so that one arm will close the gate as the receiver tilts over, and the other will open it and hold it open when the receiver returns to its original position, so that, in this latter position of the receiver the grain will flow constantly from the orifice so as to fully charge the receiver after the main discharge ceases.

The object of thus having two discharging orifices from the hopper B, will be readily understood, for if there was only one orifice, and this made of a size to allow a large and full flow of grain to the receiver before the measured quantity could be attained, the force or impact of the fall of grain would tilt the receiver, but by having a large and small orifice and shutting off the flow of grain from the large one before the force acquired by its fall could tilt the receiver, the exact charge may be obtained before the box is made to tilt.

K, is a following hook, pivoted at one end to the side of standard A, with its hooked end projecting out from the standard sufficiently far to catch and hold the receiver until this end of the beam descends and raises the secondary weight H, at this moment the hook rests on a pin $h'$, Fig. 1, and permits the receiver to tilt and discharge its contents. This hook is merely to insure the receiver against tilting by the fall of grain from the hopper. The hook or latch receives and holds the receiver again on its return after a discharge.

Having thus described the several parts forming my improved automatic grain weighing machine and their respective functions I will proceed to give a brief description of the operation of the whole machine. The hopper receives its supply from any suitable source and with both orifices open, and the receiver and scale beam in the position represented in black lines. The grain continues to flow from both orifices of the hopper until the charge is nearly obtained when the scale beam and receiver will be depressed, and the parts will assume the position indicated by red lines Fig. 1. The gate C, instantly closing, will now stop the main flow from the hopper, but as the flow continues from the gate C′, the exact charge will be attained, and the secondary weight, scale beam receiver and gate C′, will assume the position represented by blue lines Fig. 1, when the measured quantity will be instantly discharged and the counter weight on the lever E, will return the receiver back to its former position, at the same time open both gates and admit of another supply of grain to the receiver, and in this way the automatic operation may be kept up as long as the hopper will supply the demand.

Having thus described my invention I claim as new and desire to secure by Letters Patent—

1. The combination of the weighted pendulum lever E, with the scale beam F, and weighing box D, in the manner and for the purpose substantially as herein shown and described.

2. I also claim the combination in the manner herein shown and described of the gates C, C′, with the double discharging bottomed hopper B, and oscillating weighing box D, for the purpose set forth.

LOVETT EAMES.

Witnesses:
R. G. CAMPBELL,
M. M. LIVINGSTON.